March 13, 1956  W. AEBI  2,737,816

APPARATUS FOR DRIVING THE CUTTER BAR OF A MOWING MACHINE

Filed July 24, 1951

Inventor:-
Willy Aebi,
by
Pierce, Scheffler & Parker,
Attorneys.

United States Patent Office 2,737,816
Patented Mar. 13, 1956

2,737,816
APPARATUS FOR DRIVING THE CUTTER BAR OF A MOWING MACHINE

Willy Aebi, Wynigen, Switzerland, assignor to Aebi & Co. Maschinenfabrik, Burgdorf, Switzerland, a joint-stock company Application July 24, 1951, Serial No. 238,322
Claims priority, application Switzerland February 3, 1951

1 Claim. (Cl. 74—48)

This invention relates to apparatus for driving the moving blade or cutter bar of a mowing machine, and more particularly to apparatus including a rotating shaft for actuating an oscillating lever mounted upon a bearing pin having an axis normal to the plane of movement of the cutter bar, one end of the lever being pivotally or otherwise flexibly connected to the cutter.

An object of the invention is to provide apparatus for driving the reciprocating cutter bar of a mowing machine, the apparatus including a rotating shaft, a lever supported for oscillation about an axis normal to the shaft axis and having at its driven end two guide plates parallel to each other and to its oscillation axis, and a sliding block between said guide plates and supported upon a crank pin so inclined to the rotating shaft that its axis intersects the shaft axis at the oscillation axis of the lever. An object is to provide driving apparatus of the type stated which includes an oil-tight crank casing for the driven end of the oscillating lever, and in which the oscillating lever extends through and has a force fit in a transverse bore of a bearing pin forming a part of the wall of the crank casing.

These and other objects and the advantages of the invention will be apparent from the following specification when taken with the accompanying drawing in which.

Figure 1:
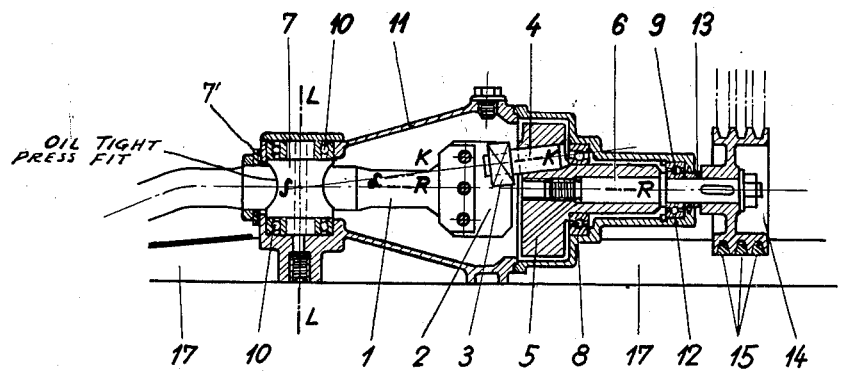
Fig. 1 is a vertical section through the crank case of driving apparatus embodying the invention.
Figure 2:
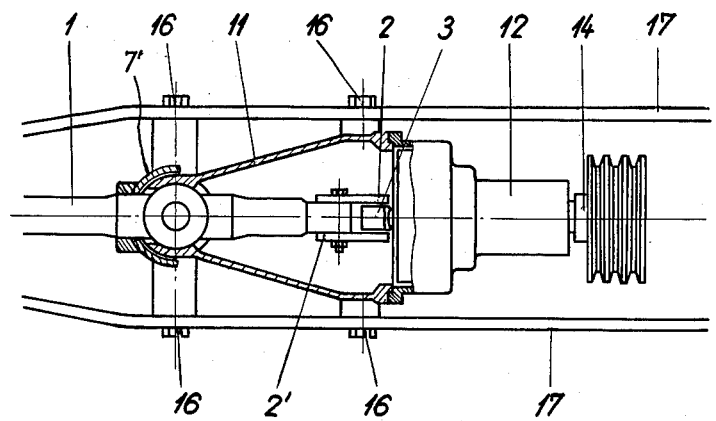
Fig. 2 is a plan view, partly in section.

In the drawing, the reference numeral 1 identifies an oscillating lever having an outer end connected to the mowing machine cutter bar, not shown, and provided at its inner end with two parallel guide plates 2, 2' which may be secured to the lever by screws or bolts. A slide block 3 of rectangular parallelepiped form fits snugly between the guide plates 2, 2' and is supported for relative rotation with respect to a crank pin 4 which is rigidly fixed to a crank disk 5 on a drive shaft 6.

The lever 1 extends through a cylindrical bore of and is supported for oscillation by a bearing pin 7, and the axis K—K of the crank pin 4 is at an angle α to the axis R—R of the drive shaft 6 such that these axes, when extended, intersect at a point S on the longitudinal axis L—L of the bearing pin 7. The axis L—L is normal to the plane of movement of the cutting bar of the mowing machine, and the reduced diameter ends of the bearing pin are journalled in the upper and lower ball bearings 10 carried by the forward section 11 of an oil-tight casing. The bearing pin 7 oscillates in the casing section 11, and fits snugly on opposed arcuate seats to form a part of the oil-tight casing wall. An oil-tight connection of the lever 1 to the bearing pin 7 is preferably provided, as shown, by extending the lever through and press-fitting it in a transverse bore through the enlarged diameter central portion of the pin 7. A semi-cylindrical shield 7' of metal, leather, rubber or the like is preferably mounted on the lever 1 to keep dirt from the outer face of the bearing pin 7 as it oscillates on the arcuate seats of the casing 11 during operation of the mowing machine.

The crank disk 5 and shaft 6 are supported in the rear section 12 of the casing by bearings 8 and 9, and the shaft extends through an oil-tight opening 13 at the rear of the casing section 12. The shaft is preferably operated from the motor, not shown, which drives the mowing machine through an elastic or friction coupling but it may be driven by a chain belt passing over an idler pulley or sprocket which can be displaced laterally to engage a driving pulley or sprocket. As shown, the shaft 6 carries a pulley 14 which is grooved to receive V-belts 15 which pass around a motor-driven pulley, not shown.

Bosses or lugs 16, 16 extend laterally from the casing section 11 for mounting the drive apparatus on side bars 17, 17 which carry the mowing knives, not shown. A set of mounting lugs is alined with the bearing pin 7 to provide a relatively rigid support for the oscillating lever 1, and the other mounting lugs are at the rear of the casing section 11.

Figure 3:
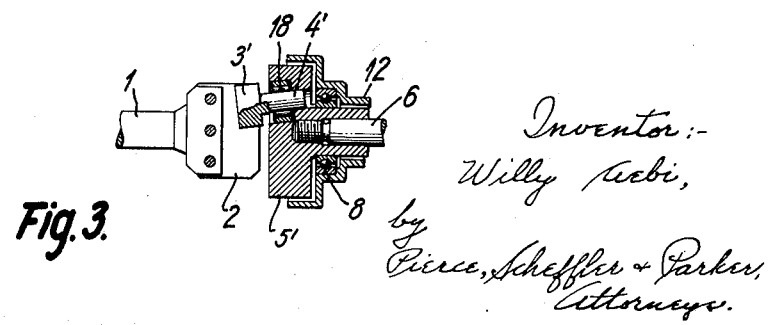
Fig. 3 is a fragmentary vertical section illustrating another mounting for the sliding block which drives the oscillating lever.

In a modified construction, as shown in Fig. 3, the slide block 3' is rigidly fixed to the crank pin 4', and the latter is rotatably mounted on the crank disk 5' by a roller bearing 18.

All moving parts are well lubricated as oil may be poured into the oil-tight crank case to flow over the slide block and the guide plates, and to fill the crank case to an appropriate level for splash lubrication. The casing section 11 is longitudinally split in conventional manner, not shown, for removal of the oscillatory system for inspection, cleaning and repair, or the rear casing section 12 may be removed for access to the guide plates 2, 2' and the slide block 3. The parts are readily separated since the block 3 slides between the plates 2, 2' but is not mechanically connected to the plates.

I claim:

In apparatus for transmitting motion, an oil-tight casing adapted to contain a lubricant and having opposed arcuate surfaces at one end forming a seat, a bearing pin snugly fitting said opposed arcuate surfaces and forming a part of the wall of said casing, said bearing pin having a cylindrical bore therethrough and reduced diameter ends, bearings mounted in said casing and receiving said reduced diameter ends of said bearing pin to support the same for oscillation about an axis between said arcuate seat surfaces, a lever extending through and having an oil-tight press fit in the bore of said bearing pin, the outer end of said lever extending to the exterior of said casing, guide means at the inner end of said lever providing a guide slot with opposed walls parallel to each other and to said bearing pin axis, a slide block within said guide slot and having parallel planar surfaces in sliding surface contact with said opposed parallel walls of said guide slot, a drive shaft entering said casing through an oil-tight opening at the end of said casing opposite said opposed arcuate surfaces, bearing means supporting said drive shaft for rotation about an axis which if extended would pass through said bearing pin axis, a crank pin supporting said slide block from and for relative rotation with respect to said drive shaft, the axis of said crank pin being inclined to the axis of said drive shaft and if extended intersecting the same at the axis of said bearing pin, and an arcuate shield substantially coaxial with said bearing pin and mounted on said lever at the exterior of said casing.

References Cited in the file of this patent
UNITED STATES PATENTS

| | | |
|---|---|---|
| 396,832 | Petherick | Jan. 29, 1889 |
| 491,910 | Virtue | Feb. 14, 1893 |
| 1,454,511 | Hermann | May 8, 1923 |
| 2,439,262 | Nalbach et al. | Apr. 6, 1948 |
| 2,515,343 | Gravely | July 18, 1950 |
| 2,558,103 | Ruckstahl | June 26, 1951 |
| 2,617,133 | Cocchiola | Nov. 11, 1952 |